United States Patent [19]

Takahashi

[11] Patent Number: 4,880,034

[45] Date of Patent: Nov. 14, 1989

[54] FLUID PRESSURE REGULATING APPARATUS

[75] Inventor: Shiro Takahashi, Tokyo, Japan

[73] Assignee: Man Design Co., Ltd., Tokyo, Japan

[21] Appl. No.: 79,411

[22] Filed: Jul. 30, 1987

[51] Int. Cl.[4] ............................................. F15D 1/00
[52] U.S. Cl. ...................................... 138/40; 137/495; 137/505.25
[58] Field of Search ................... 138/40; 137/505.25, 137/505.11, 505.14; 141/495

[56] References Cited

U.S. PATENT DOCUMENTS

| 2,888,949 | 6/1959 | Evans | 137/505.25 |
| 3,590,860 | 7/1971 | Stenner | 137/495 |
| 4,516,600 | 5/1985 | Sturman et al. | 137/495 |
| 4,614,470 | 9/1986 | Mitsuharu et al. | 409/230 |

FOREIGN PATENT DOCUMENTS

| 1966571 | 6/1973 | Fed. Rep. of Germany . |
| 2348387 | 5/1974 | Fed. Rep. of Germany . |
| 1378297 | 12/1974 | United Kingdom . |
| 1435743 | 5/1976 | United Kingdom . |
| 1445110 | 8/1976 | United Kingdom . |

*Primary Examiner*—Ernest G. Cusick

*Attorney, Agent, or Firm*—Nixon & Vanderhye

[57] ABSTRACT

A fluid pressure regulating apparatus comprises a body having a fluid passage to be connected to a machine driven by a pressurized fluid and to a pressurized fluid supplying source. The rotation of a ring member on the outer surface of the body, around the longitudinal center line thereof, responsively moves a regulating member inside the body, so as to vary selectively the pressing force, applied by the regulating member to an urging member sandwiched between the regulating member and an actuator member when the actuator member is moved from a first position to a second position inside the body by an increased urging force of the urging member, a valve body is driven by the actuator member and moved from a closed position to an open position. The valve body is maintained in its open position by the actuator member, to which the increased urging force is applied, against the pressure of the fluid in the passage. When the actuator member is in its first position (i.e., without an increased urging force being applied thereto), the valve body is allowed to move toward its open position. Thus, the urging force responsively arising from the rotation of the ring causes movement of the valve body, which movement thereby regulates the pressure of the fluid supplied to the machine.

11 Claims, 5 Drawing Sheets

FLUID PRESSURE REGULATING APPARATUS

BACKGROUND OF THE INVENTION

The present invention relates to a fluid pressure regulating apparatus for regulating the pressure of pressurized fluid supplied to a machine which uses the pressurized fluid as a driving source.

To maintain the pressure of pressurized fluid supplied into a pressurized fluid circuit for supplying the pressurized fluid to a machine which uses the pressurized fluid, particularly compressed air, fluid pressure regulating apparatus for regulating the pressure of the pressurized fluid has been used. The conventional fluid pressure regulating apparatus used to perform this purpose has a diaphragm for receiving the pressure of the fluid and a compression coil spring loading a force against the pressure of the fluid to the diaphragm, and controls a valve body to open or close on the basis of the unbalance between the pressure of the fluid loaded to the diaphragm and the urging force of the coil spring. In this apparatus, the pressure of the pressurized fluid passing through the fluid pressure regulating apparatus can be varied, or regulated, by changing the urging force loaded to the diaphragm by the coil spring. The diaphragm and the coil spring are disposed in the body of the regulating apparatus to operate in the radial direction of a fluid passage, and an urging force regulating handle as a pressure regulating actuator for changing, i.e., regulating, the pressure of the pressurized fluid passing in the regulating apparatus by changing the urging force loaded to the diaphragm by the coil spring is disposed radially outward than the coil spring. The handle is projected radially outward from the outer surface of the body of the regulating apparatus.

Since the conventional fluid pressure regulating apparatus constructed as described above has only one urging force regulating handle provided on the outer surface of the body of the apparatus, when the machine is displaced, the hand of an operator is hardly approached to the handle or the operation of the regulating handle can be hardly executed. According to the attitude of the machine at using time, the regulating handle projected radially outwardly from the outer surface of the body of the apparatus limits the range of displacing the machine or makes harder to operate the machine.

SUMMARY OF THE INVENTION

The present invention has been made in consideration of this and has an object to provide a fluid pressure regulating apparatus in which an operator can readily approach the pressure regulating actuator of the apparatus irrespective of the displacement of a machine which uses pressurized fluid as a driving source, and can readily operate the pressure regulating actuator irrespective of the displacement of the machine, and which does not limit the range of displacing the machine, and does not lose the easiness operating the machine.

In order to achieve the above and other objects, there is provided according to the present invention a fluid pressure regulating apparatus for regulating the pressure of pressurized fluid supplied to a machine which uses the pressurized fluid as a driving source comprising: a body having a fluid passage and means for connecting the fluid passage pressurizing fluid supplying means and to the machine which uses the pressurized fluid as driving source; a valve seat formed in the fluid passage; a valve body disposed in the fluid passage so as to be movable between a closed position where the valve body is seated on the valve seat and the open position where the valve body is separated from the valve seat; an actuator member being movable between a first position and a second position in the fluid passage, the actuator member at the first position allowing the movement of the valve body toward the closed position, driving the valve body to the open position by the movement thereof from the first position to the second position, and being urged to the first position by the pressure of the pressurized fluid in the fluid passage; urging means provided in the body so as to urge the actuator member to the second position against the pressure of the pressurized fluid in the fluid passage; and an urging force regulating member provided to be movable in the body by the rotation of the pressure regulating ring member and increasing or decreasing the pressing force to the urging means by the movement in the body so as to increase or decrease the magnitude of the urging force generated in the urging means.

In the fluid pressure regulating apparatus constructed as described above, the unbalance between the urging force of the urging means acting on the valve body and the pressure of the pressurized fluid causes the valve body to open or close. As a result, the pressure of the pressurized fluid supplied to the machine which uses the pressurized fluid as a drive source is regulated. However, the pressure regulating actuator, provided on the outer surface of the body so as to move the urging force regulating member so that the pressure of the pressurized fluid supplied to the machine is regulated, is different from the conventional one, and is constructed of a ring provided on the outer surface of the body so as to be rotatable around the longitudinal center line of the body. Since the pressure regulating actuator of ring shape described above is exposed on the outer surface of the body over for all the entire distance in the circumferential direction, whereever the machine may displace in x, y, z, directions, the operator can readily approach it to easily rotate it. Since the pressure regulating actuator of ring shape can be extended on the outer surface of the body for all over the entire distance in the circumferential direction with it outer peripheral surface locating in the same plane as the outer surface of the body, according to the attitude at using time of the machine, the machine does not collide with other member to disturb the displacement of the machine when the machine is displaced, and does not collide with the hands of the operator to disturb the easiness of operation of the machine.

In the fluid pressure regulating apparatus according to the present invention constructed as described above, it is preferable that the fluid passage is substantially extended in a direction along the longitudinal center line of the body, the valve seat is directed in a direction along the longitudinal center line, the valve body is movable between the closed position and the open position along the longitudinal center line, the actuator member is movable between the first position and the second position in a direction along the longitudinal center line, and the urging force regulating member moves in the body in a direction along the longitudinal center line.

With the construction described above, since the moving directions of substantially all movable members in the body are in a direction along the longitudinal center line of the body, the size of the body in the radial direction can be reduced.

In the apparatus described above, it is more preferable that urging means is a coil spring provided in the body to extend the center line thereof in a direction along the longitudinal center line. This causes the structure of the fluid pressure regulating apparatus to become simple to contribute to the reduction in the size of the body in the radial direction.

Further, if the valve seat, the valve body, the actuator member, the urging force regulating member, and the urging means are concentrically disposed in the body to radially overlap each other, not only the size of the body in the radial direction but also the size thereof in the direction along the longitudinal center line can be reduced, thereby the size of the entire body becomes compact.

In the fluid pressure regulating apparatus according to the present invention, it is preferable that the apparatus further comprises indicating means provided on the outer surface of the body so as to indicate the value corresponding to the magnitude of the urging force generated from the urging means.

Further, it is more preferable that the indicating means, comprises scale displaying means provided on the outer surface of the body so as to display a scale and scale indicating member moving on the scale displaying means corresponding to the rotation of the pressure regulating ring.

The indicating means constructed as described above has a simple construction.

In the apparatus described above, it is also more preferable that the scale indicating member is fixed to the urging force regulating member to project over the outer surface of the body, and moved in a direction along the longitudinal center line on the scale displaying means.

The combination of the scale displaying means and the scale indicating member can be readily observed and the scale indicated by the free end of the scale indicating member on the scale displaying means can be readily read.

DETAILED DESCRIPTION OF THE PREFERRED EMBODIMENTS

Figure 1:
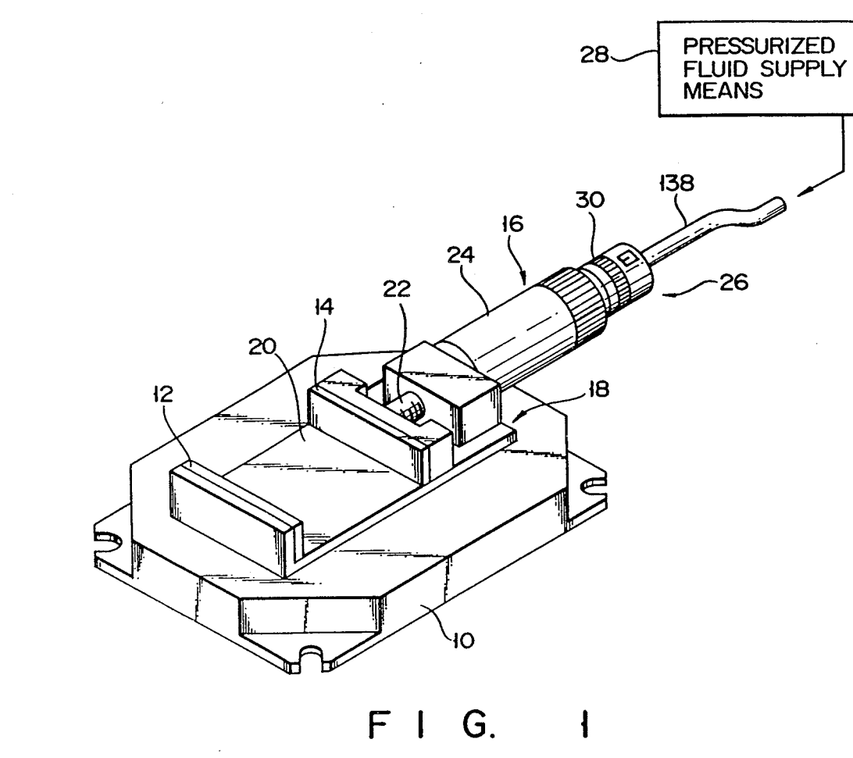
FIG. 1 is a schematic perspective view showing a clamping apparatus using a fluid pressure regulating apparatus according to an embodiment of the present invention.

FIG. 1 schematically shows the external appearance of a clamping apparatus using a fluid pressure regulating apparatus according to an embodiment of the present invention.

The clamping apparatus is fixed at its base frame 10 by fixing bolts on a bed of a machine tool such as a drilling machine, not shown. Clamping unit 18, having a pair of clamping plates 12, 14 and clamping plate driving means 16 for driving clamping plates 12, 14, is placed on base frame 10.

Clamping unit 18 has sub base member 20 to which first clamping plate 12 is fixed. Such base member 20 is fixed to base frame 10, and second clamping plate 14 is so placed on sub base member 20 as to approach or move away from first clamping plate 14. Leadscrew shaft 22 of clamping plate driving means 16 is fixed at its one end to second clamping plate 14, and shaft 22 is projected from outer cylindrical member 24 of clamping plate driving means 16 concentrically located with shaft 22 and rotatably provided on sub base member 20. Rotation of outer cylindrical member 24 cause leadscrew shaft 22 to move forward or backward and hence cause second clamping plate 14 to approach or move away from first clamping plate 12. Pressurized fluid supplying means 28 is coupled through fluid pressure regulating apparatus 26 to outer cylindrical member 24. In this embodiment, pressurized fluid supplying means 28 is a compressor. Leadscrew shaft 22 is movable in the back and forth direction for a relatively short distance in outer cylindrical member 24 irrespective of the rotation of shaft 22 or member 24, and pressurized fluid, i.e., compressed air, supplied from supplying means 28 into cylindrical member 24 acts to shaft 22 so that shaft 22 moves forward in cylindrical member 24. The action of such pressurized fluid reinforces the clamping force to a workpiece by first clamping plate 12 and second clamping plate 14 to be performed by the rotation of cylindrical member 24. Fluid pressure regulating apparatus 26 maintains the magnitude of the pressure of the pressurized fluid supplied from pressurized fluid supplying means 28 into outer cylindrical member 24 at constant and the rotation of a pressure regulating ring member 30 on the outer peripheral surface of outer cylindrical member 24 enables pressure regulating apparatus 26 to set freely the magnitude of that pressure.

Figure 2:
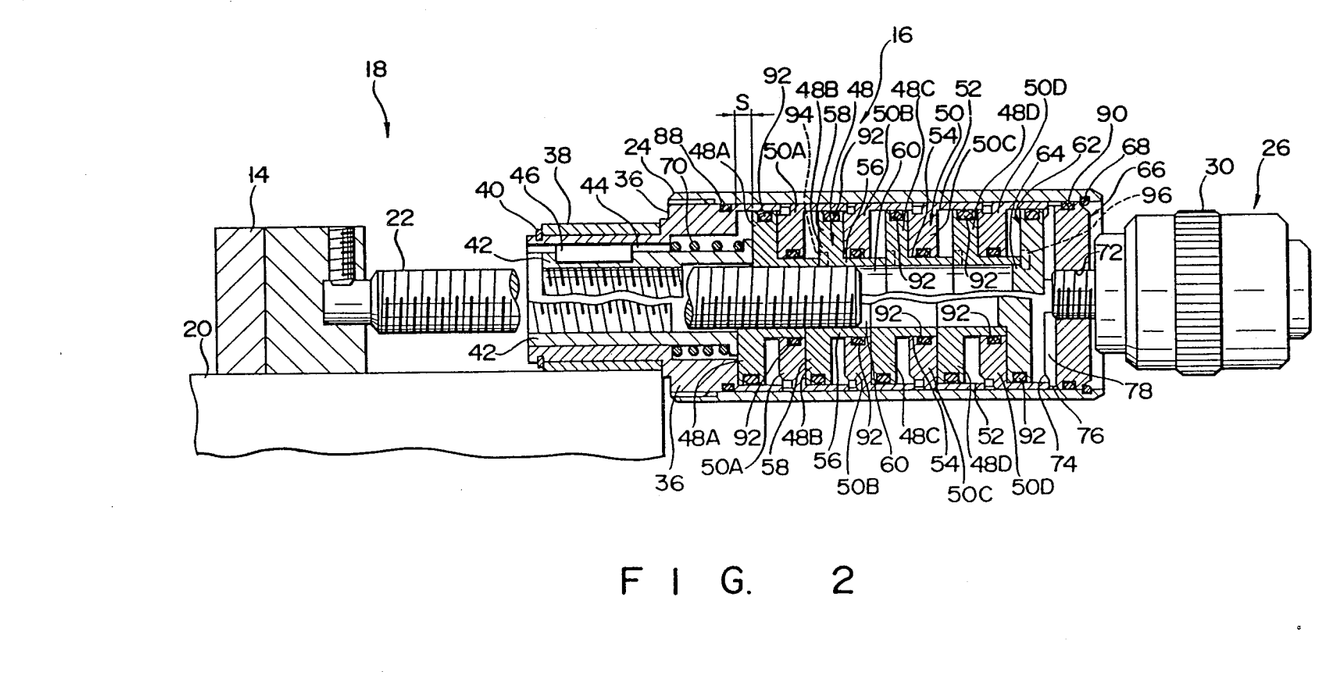
FIG. 2 is a schematic longitudinal sectional view of clamping plate driving means of the clamping apparatus of FIG. 1, the clamping plate driving means using pressurized fluid as a driving source, wherein the upper half illustrates the state in which pressurized fluid from pressurized fluid supplying means has not been supplied and the lower half illustrates the state in which pressurized fluid from pressurized fluid supplying means has been supplied.

FIG. 2 is a longitudinal sectional view showing the detail of clamping plate driving means 26 of clamping unit 18. The longitudinal sectional view of outer cylindrical member 24 shows in the upper portion the state that compressed air has not yet supplied into outer cylindrical member 24 and in the lower portion the state that compressed air has already supplied into outer cylindrical member 24.

As shown in detail in FIG. 2, second clamping plate 14 is screwed on the left end of leadscrew shaft 22.

Outer cylindrical member 24 is fixed to a large-diameter portion of stepped cylindrical housing block 36, and a small-diameter portion of housing block 36 is supported by a holder member 38 fixed on sub base member 20 so that the housing block 36 is located concentrically with shaft 22 and is rotatable relative to sub base member 20. Stop ring 40 is engaged with the outer periphery of small-diameter portion of housing block 36 projected from holder member 38 at second clamping plate side, and stop ring 40 contacts the end face of holder member 38 at the second clamping plate side to prevent housing block 36 from dropping out from holder member 38.

Inner cylindrical member 42 is contained in the bore of housing block 36 so as to be slidable therein, and threadably fitted over leadscrew shaft 32. Keyway 44 is formed on the inner peripheral surface of the bore of block 36 so as to extend in a direction along the center line of the bore of block 36, and key 46 fixed on the outer peripheral surface of inner cylindrical member 42 is contained in keyway 44 so as to be slidable thereto. Key 46 is engaged with keyway 44 in the circumferential direction to integrally rotate outer cylindrical member 24 and inner cylindrical member 42, and the rotation of inner cylindrical 42 cause leadscrew 22 to move in the back and forth direction. Key 46 also slides in keyway 44 in a direction along the center line of the bore of block 36 to integrally move shaft 22 and inner cylindrical member 42 in the back and forth direction.

Piston 48 for integrally moving inner cylindrical member 42 and shaft 22 in the back and forth direction, and cylinder 50 for slidably contacting piston 48 are contained in the bore of outer cylindrical member 24. Cylinder 50 is constructed by four member 50A, 50B, 50C, 50D of the same structure disposed in series in a direction along the center line thereof, and each member 50A, 50B, 50C or 50D has a thin outer peripheral portion 52 fitted to the inner peripheral surface of the bore of outer cylindrical member 24 and inner flange 54 projected radially inward from the inner surface of thin outer peripheral portion 52 at inner cylindrical member side. Piston 48 is also constructed by four members 48A, 48B, 48C, 48D of the same structure disposed in series in a direction along the center line thereof, and each member 48A, 48B, 48C or 48D has cylindrical inner peripheral portion 56 slidably inserted into the corresponding one of the projecting end faces of inner flanges 54 of the four cylinder members 50A, 50B, 50C, 50D and outer flange 58 projected radially outward from the outer surface of inner peripheral portion 56 at the inner cylindrical member side. The projecting end faces of outer flanges 58 of second to fourth members 48B, 48C, 48D of piston 48 are slidably fitted to the inner peripheral surfaces of thin outer peripheral portions 52 of first to third members 50A, 50B, 50C of cylinder 50, and only projecting end face of outer flange 58 of first member 48A of piston 48 is slidably fitted to the inner peripheral surface of the bore of block 36 at the end of the outer cylindrical member side. The bore of each member 48A, 48B, 48C or 48D of piston 48 has a diameter slightly larger than the outer diameter of shaft 22, and the end of shaft 22 projected form inner cylindrical member 42 to outer cylindrical member 24 is inserted into bore 60 of piston 48 formed of the bores of four members 48A, 48B, 48 and 48D.

The peripheral surface of disc-like end piston 62 is slidably fitted to the inner peripheral surface of thin outer peripheral portion 52 of fourth member 50D of cylinder 50, and boss 64 is formed at the side surface of end piston 62 contacted with the free end face of cylindrical inner periphery 56 of fourth member 48D of piston 48, boss 64 being slidably fitted into bore of cylindrical inner peripheral portion 56 of fourth member 48D.

The outer peripheral surface of end cover 66 is fitted to the inner peripheral surface of bore of outer cylindrical member 24 at the end located farther to inner cylindrical member 42, and the outer peripheral area of the inner side face of end cover 66 is contacted with the free end face of thin outer peripheral portion 52 of fourth member 50D of cylinder 50. End cover 66 is fixed to the inner peripheral surface of the bore of outer cylindrical member 24 by stop ring 68. Thus, four members 50A, 50B, 50C, 50D of cylinder 50 are clamped by the outer cylindrical member side end face of housing block 36 and the inside face of end cover 66 to be fixed in the bore of outer cylindrical member 24.

Compression coil spring 70 is wound on the end of inner cylindrical member 42 at outer cylindrical member side. Spring 70 is contacted at both ends with a spring seat formed on the end face of block 36 at the outer cylindrical member side of block 36 and with a spring retainer flange of inner cylindrical member 42 at the outer cylindrical member side, so that inner cylindrical member 42 urges piston 48 and end piston 62 in a direction for approaching end cover 66 of outer cylindrical member 24.

Connecting hole 72 threadably engaged with the outlet of fluid pressure regulating apparatus 26 in a hermetically sealing manner is formed at end cover 66.

Pressurized fluid passages are formed on the inside surfaces of end cover 66, the outer peripheral surfaces of thin outer peripheral portions 52 of four members 48A, 48B, 48C, 40D of cylinder 50 and the side surfaces of the four members located at the inner cylindrical member side, the pressurized fluid passages making pressurized fluid supplied from pressurized fluid supplying means 28 through fluid pressure regulating apparatus 26 into outer cylindrical member 24 of clamping plate driving means 16 act on four member 48A, 48B, 48C, 48D of piston 48.

The pressurized fluid passages will be described in more detail. As shown in detail in FIG. 3, axial projections 74, 76 having diameter smaller than the maximum diameter of the inner side surface of end cover 66 are concentrically stepwisely formed on the inner side surface of end cover 66, and radially extended grooves 78 are formed on projections 74, 76. A chamfered portion 80 extended in a direction along the longitudinal center line of cylinder 50 is formed on the outer peripheral surface of thin outer peripheral portions 52 of four members 48A, 48B, 48C, 48D of cylinder 50, and axial projections 82, 84 having diameter smaller than the maximum diameter of each of the four members are concentrically stepwisely formed on the side surface of each of four members located at the inner cylindrical members side, and radially extended grooves 86 are formed on axial projection 84 disposed outward.

Figure 3:
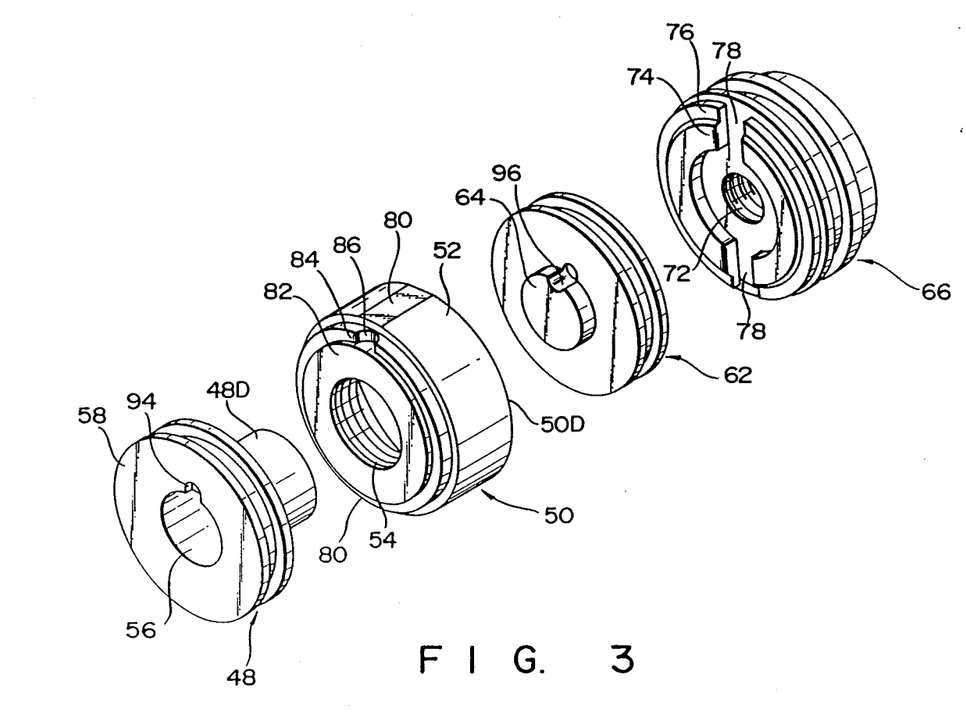
FIG. 3 is a perspective exploded view showing the state that only a fourth piston component member, a fourth cylinder component member, an end piston and an end cover of clamping plate driving means are separated to illustrate the construction of a pressurized fluid passage in the clamping plate driving means of FIG. 2.

The pressurized fluid supplied from pressurized fluid supplying means 28 into outer cylindrical member 24 of clamping plate driving means 16 is acted on the end cover side surface of end piston 62 and is introduced through radial grooves 78 of end cover 66 into a space formed between the outer peripheral surface of axial projection 76 disposed outward and the inner peripheral surface of the bore of outer cylindrical member 24. Compressed fluid in this space is introduced through chamfered portions 80 of four members 50A, 50B, 50C, 50D of cylinder 50 into each space formed between the outer peripheral surface of axial projection 84 of each of the four members and the inner peripheral surface of the bore of outer cylindrical member 24, further introduced through each radial groove 86 into each space formed between the projecting end face if axial projection 84 of each of the four members and the corresponding side surface of the end cover side of outer flange 58 of each of four members 48A, 48B, 48C, 48D of piston 48, and acts on the flanges 58 of four corresponding members 48A, 48B, 48C, 48D.

Piston 48 acted with compressed air to the outer flanges 58 of four members 48A, 48B, 48C, 48D is moved, together with end piston 62, to project inner cylindrical member 42 and shaft 22 from outer cylindrical member 24 against the urging force of compression coil spring 70.

O-rings 88, 90 are mounted on the portion of the outer peripheral surface of housing block 36, the portion being engaged with the inner peripheral surface of outer cylindrical member 24, and on the outer peripheral surface of end cover 66 to prevent compressed fluid from leaking out from gaps between the portion, the outer peripheral surface of end cover 66 and the inner peripheral surface of outer cylindrical member 24. Piston packings 92 such as O-rings are mounted on the outer peripheral surfaces of outer flanges 58 of four members 48A, 48B, 48C, 48D of piston 48 and the outer peripheral surface of end piston 62 to prevent compressed fluid from leaking from gaps between the outer peripheral surface of outer flanges 58 of four members 48A, 48B, 48C, 48D and the inner peripheral surfaces of thin outer peripheral portions 52 of four members 50A, 50B, 50C, 50D of cylinder 50, on which the outer flanges 58 of four members 48A, 48B, 48C, 48D are slidably contacted, and between the outer peripheral surface of end pistons 62 and the end of the inner peripheral surface of housing block 36, the end being located nearer to outer cylindrical member 24.

Exhaust groove 94 is formed on the side surface of outer flange 58 of each of second to fourth members 48B, 48C, 48D of piston 48, the side surface being located nearer to the inner cylindrical member 42 so as to extend from the radially outward position than the outer peripheral surface of inner cylindrical periphery 56 to the inner peripheral surface of inner cylindrical peripheral portion 56. Exhaust groove 96 is formed on the side surface of end piston 62, the side surface being located nearer to inner cylindrical member 42, so as to extend from the radially outward position than the outer peripheral surface of inner cylindrical peripheral portion 56 of fourth member 84D of piston 48 to the side surface of boss 64, the side surface being located nearer to inner cylindrical member 42. Exhaust grooves 94, 96 exhaust air from gaps (see the upper half portion in FIG. 2) between inner cylindrical member side faces of outer flanges 58 of second to fourth members 48B, 48C, 48D of piston 48 and the side of faces of end cover sides of inner flanges 54 of first to third members 50A, 50B, 50C, of cylinder 50, and between inner cylindrical member side face of end piston 62 and side face of end cover side of inner flange 54 of fourth member 50D of cylinder 50 when piston 48 is moved, together with end piston 62, by compressed fluid supplied from compressed fluid supplying means to project inner cylindrical member 42 and shaft 22 from outer cylindrical member 24 against the urging force of compression coil spring 70. Therefore, the movement of piston 48 as described above is not prevented. On the contrary, when the supply of the compressed fluid from compressed fluid supplying means is stopped to move piston 48 and end piston 62 to draw shaft 22, together with inner cylindrical member 42, into outer cylindrical member 24 by the urging force of compression coil spring 70, exhaust grooves 94, 96 allows the air to flow into the above-mentioned gaps not to disturb the above-described movement of the piston 48.

When the workpiece is clamped between a pair of clamping plates 12 and 14 by clamping plate driving means 16 composed as described above, the workpiece is first placed between the clamping plates 12 and 14 on the upper surface of sub base member 20, outer cylindrical member 24 is then rotated to project shaft 22 from outer cylindrical member 24 so that the clamping plates 12 and 14 approach to each other, thereby lightly contacting the clamping plates 12 and 14 with the workpiece. Thereafter, the outer cylindrical member 24 is not necessarily further rotated to increase the clamping force of the workpiece by the clamping plates 12, 14.

Then, fluid pressure regulating apparatus 26 is operated to introduce pressurized fluid from pressurized fluid supplying means 28 into the bore of outer cylindrical member 24. As a result, the pressure of the pressurized fluid loaded to piston 48 is transmitted through inner cylindrical member 42, and shaft 22 to second clamping plate 24 to thereby increase the clamping force.

To release the clamping of the workpiece by the clamping plates 12, 14, fluid pressure regulating apparatus 26 is operated to stop the introduction of the pressurized fluid into the bore of outer cylindrical member from pressurized fluid supplying means 28 and to communicate the bore of outer cylindrical member 24 with the atmosphere. Thus, the above-mentioned clamping force applied to the workpiece by the clamping plates 12, 14 is released. Thus, since the clamping plates 12, 14 lightly contact the workpiece, the workpiece can be readily removed from between the clamping plates 12 and 14. Outer cylindrical member 24 may be rotated to draw shaft 22 into outer cylindrical member 24 to move the clamping plates 12 and 14 far away one another, as required.

According to the above-mentioned clamping plate driving means 16, the workpiece can be clamped by a pair of clamping plates 12 and 14 always with a predetermined clamping force irrespective of the magnitude of the clamping torque applied to outer cylindrical member 24. Further, since the clamping force is a total of pressures loaded from the compressed fluid to the end face of end piston 62 at end cover side and outer flanges 58 of four members 48A, 48B, 48C of piston 48, it is much stronger than the clamping force only generated by the clamping torque of outer cylindrical member 24.

Even if a gap or gaps is produced between the workpiece placed on sub base member 20 and first clamping plate 12 and/or second clamping plate 14, the workpiece can be clamped by a pair of clamping plates 12, 14 always with a predetermined clamping force if the total of the distance of the gap or gaps is slightly shorter than the range of the maximum relative moving distance S of piston 48 to outer cylindrical member 24 and cylinder 50 shown in FIG. 2.

Figure 4:
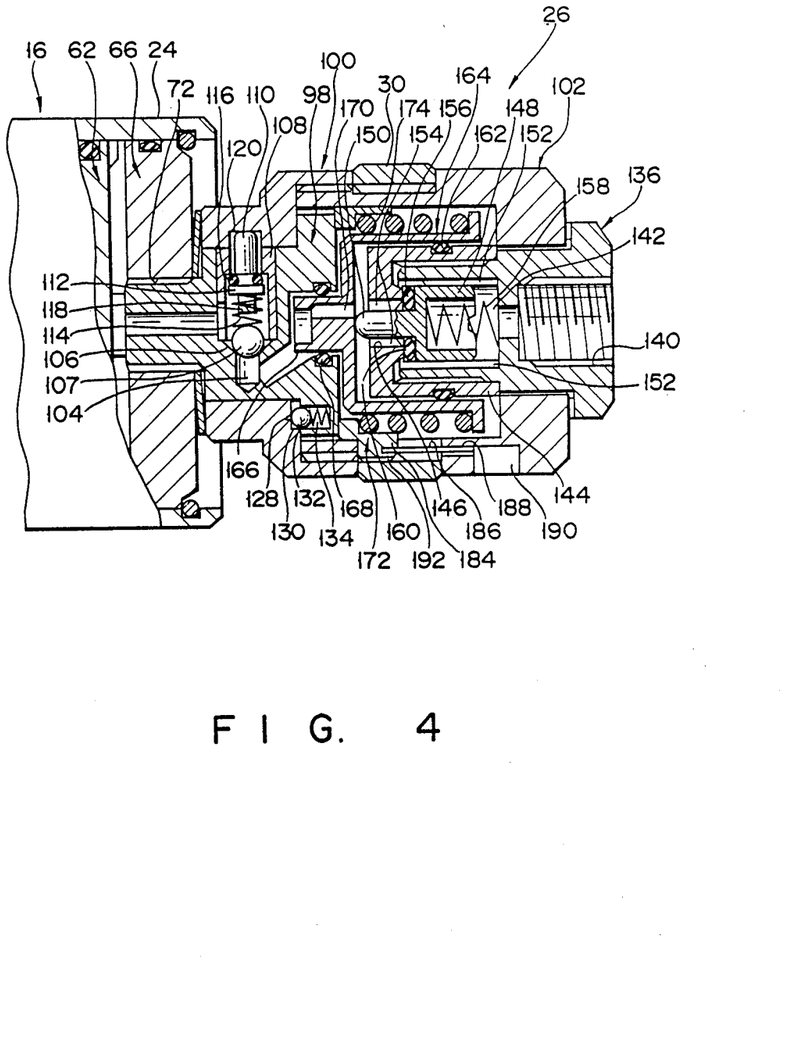
FIG. 4 is a schematic longitudinal sectional view of a fluid pressure regulating apparatus coupled with the clamping plate driving means of the clamping apparatus of FIG. 1.

FIG. 4 is a longitudinal sectional view of fluid pressure regulating apparatus 26 according to the embodiment of the invention.

Fluid pressure regulating apparatus 26 has joint member 98 hermetically threaded with connecting hole 72 of end cover 66 of clamping plate driving means 16. Stepped cylindrical front case 100 is fitted over the stepped outer peripheral surface of joint member 98, and stepped cylindrical rear case 102 is threadably engaged with the inner peripheral surface of front case 100 to integrally connect front case 100.

Fluid passage 104 substantially extended in a direction along the longitudinal center line of clamping plate driving means 16 is formed in joint member 98, and passage 104 is opened at its one end within outer cylindrical member 24 at the portion threaded to connecting hole 72 of end cover 66 of clamping plate driving means 16, and opened at its other end with the other end face of joint member 98, the other end face being located far away from end cover 66. Passage 104 is bent to extend radially between one end and the other end thereof and conical valve seat 106 opened toward the one end is formed at the radially extending portion of passage 104. A spherical valve body 107 is seated on valve seat 106. A through hole is formed on a portion of the inner surface of passage 104 opposed to valve seat 106 and is extended to the outer peripheral surface of joint member 98. A cylindrical bush 108 with bottom wall is fitted in the through hole in the state that the bottom wall is disposed radially outward. An opening is formed at the bottom wall of bush 108, and rod-like slider 110 is radially slidably inserted into the opening. Slider 110 has outer flange 112 opposed to radially inner end face of the bottom wall of bush 108, and compression coil spring 114 is disposed between outer flange 112 and valve body 107 so as to contact at its both ends outer flange 112 and valve body 107. O-ring 116 is mounted adjacent to the bottom wall side of outer flange 112 on the outer peripheral surface of slider 110, O-ring 116 is pressed onto the radially inner end face of the bottom wall of bush 108 by the urging force of coil spring 114, and valve body 107 is pressed on valve seat 106. Cushion member 118 is fixed to the inner end face of slider 110 disposed radially outward of valve body 107.

Groove cam 120 extended circumferentially is formed at the position opposed to the bottom wall of bush 108 on the inner peripheral surface of front case 100, and the radially outer end of slider 110 projected from the outer peripheral surface of joint member 98 is inserted into groove cam 120 to contact the bottom surface of groove cam 120. The bottom surface of groove cam 120 is a cam surface formed of a part of an circle being eccentric to the longitudinal center line of front case 100 on the bottom surface, an exhaust hole 122, as shown in detail in FIG. 5, extended to the outer peripheral surface of front case 100 is formed.

In FIG. 4, slider 110 is disposed at the deepest position of the bottom surface of groove cam 120. Cushion member 118 of the inner end face of slider 110 is separated radially outward from valve body 107, and O-ring 116 pressed to the radially inner end face of the bottom wall of bush 108 shuts off the flow of fluid in exhaust hole 122. When the pressurized fluid is supplied from pressurized fluid supplying means 28 to the opening of passage 104 at the rear case side, valve body 107 is separated from valve seat 106 against the urging force of coil spring 114 by the pressure of the pressurized fluid to allow the pressurized fluid to flow from valve seat 106 toward the end of clamping plate dividing means 16. Separation of valve body 107 from valve seat 106 increases the force of coil spring 114 for pressing O-ring 116 toward the radially inner end face of the bottom wall of bush 108, thereby reliably preventing the pressurized fluid from leading out from passage 104 into the atmosphere via the through hole of the bottom wall of bush 108 and exhaust hole 122.

When front case 100 is rotated around joint member 98 until the outer projecting end of slider 110 is disposed at the most shallow position of the bottom surface of groove cam 120, slider 110 moves radially inward against the pressure of the pressurized fluid loaded to valve body 107 and the urging force of compression coil spring 114 to contact cushion member 118 with valve body 107 and to press valve body 107 on valve seat 106. Thus, the flow of the pressurized fluid from pressurized fluid supplying means 28 is shut off at valve seat 106 and the pressurized fluid in outer cylinder 24 of clamping plate driving means 16 is exhausted via the through hole of the bottom wall of bush 108 and exhaust hole 122 into the atmosphere so that the pressure in outer cylinder 24 becomes the same as the atmospheric pressure.

Figure 5:
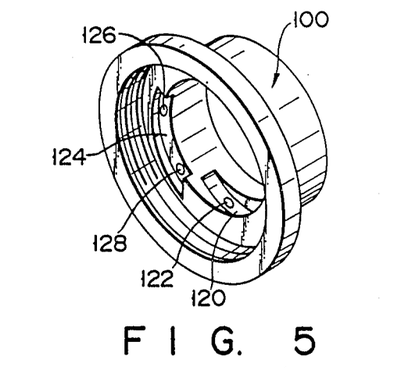
FIG. 5 is a perspective view of a joint member which is a part of the body of the fluid pressure regulating apparatus of FIG. 4.

An arcuate groove 124 extended circumferentially is formed, as shown in detail in FIG. 5, on the radially extended area of the inner surface of front case 100, and locking recesses 126, 128 are formed at both ends of the bottom surface of the groove 124 in the circumferentially direction. A locking ball containing hole 130 is formed at the position opposite to the groove 124 of front case 100 on the radially extended area of the outer surface of joint member 98, and locking ball 132 and compression coil spring 134 for externally urging locking ball 132 are contained in locking ball containing hole 130. When front case 100 is relatively rotated to joint member 98, locking ball 132 is slidably contacted with the bottom surface of groove 124, and when locking ball 132 contact either one of the end faces of groove 124 in the circumferential direction, ball 132 is seated in either one of recesses 126, 128. When locking ball 132 of joint member 98 is seated in one recess 126 of groove 124 of front case 100, the outward projecting end of slider 110 is disposed at the most shallow position of the bottom surface of cam 120 so that the pressure in outer cylinder 24 becomes the same as the atmospheric pressure. When the locking ball 132 is seated in the other recess 128, the outward projecting end of slider 110 is disposed at the deepest position of the bottom surface of cam 120 to supplying the pressurized fluid from pressurized fluid supplying means 28 into outer cylinder 24 as described above.

As shown in FIG. 4, nipple member 136 is hermetically threadably engaged in the rear end face of rear case 102. Connecting hole 140 opened with the outer end face and valve body containing hole 142 opened with the inner end face and connected with connecting hole 140 are formed in nipple member 136, and the end of pressurized fluid supplying hose 138 from pressurized fluid supplying means 28 is hermetically threadably engaged in connecting hole 140. Cap 144 for covering the inner end face of nipple member 136 is threadably engaged with the outer peripheral surface of nipple member 136 in the area of the bore of rear case 102, and through hole 146 opened with hole 142 is formed at cap 144. Cylindrical cup-shaped valve body 148 is contained in hole 146, and pressing pin 150 formed on the bottom wall of valve body 148 is inserted into through hole 146 of cap 144 to project from through hole 146 into the bore of rear case 102. A plurality of radial ribs 152, 154 extended in a direction along the longitudinal center line are formed on the inner peripheral surfaces of hole 142 and through hole 146 so as to project in the radially inward direction, and the projecting end faces of ribs 152, 154 are contacted with the outer peripheral surfaces of valve body 148 and pressing pin 150 to allow valve body 148 and pin 150 to slide in the axial direction of the pin 150. Annular packing 156 is mounted adjacent to the bottom wall of valve body 148 on the outer peripheral surface of pin 150, and valve body 148 is urged by compression coil spring 158 contained in hole 142 toward through hole 146. Packing 156 of urged valve body 148 is contacted with the peripheral area of the through hole 146 of the bottom wall of cap 144 to close through hole 146. Thus, the peripheral area of the through hole 146 of the bottom wall of cap 144 functions as valve seat 160 for valve body 148.

Through hole 146 communicates through the bore of rear case 102 with fluid passage 104 of joint member 98 and constructs, together with fluid passage 104 and valve body containing hole 142, a fluid passage for introducing the pressurized fluid supplied from pressurized fluid supplying means 28 to connecting hole 140 to the end of end case side of fluid passage 104 in the body of fluid pressure regulating apparatus 26, the body being constructed by joint member 98, front case 100, rear case 102 and nipple member 136.

Cylindrical cup-shaped actuator member 164 is slidably fitted-over O-ring 162 mounted on the outer peripheral surface of cap 144 in the bore of rear case 102, and boss 166 projected into the opening of fluid passage 104 of joint member 98 at rear case side is formed at the bottom wall of actuator member 164. O-ring 168 slidably contacted with the outer peripheral surface of boss 166 is mounted on the inner peripheral surface of the opening of fluid passage 104 at rear case side. The projecting end of pin 150 of valve body 148 is contacted with the end face of the bottom wall of actuator member 164 at cap side, and a plurality of through holes 170 are formed on the cap side end face of the bottom wall of boss 166 around the contacting position of pin 150 so as to extend in boss 166.

Spring retainer ring 172 slidably fitted on the inner peripheral surface of rear case 102 is contained in the bore of rear case 102. The inner diameter of ring 172 is larger than the outer diameter of the peripheral wall of actuator member 164 and ring 172 is disposed adjacent to joint member 98.

Compression coil spring 174 is wound on the outer peripheral surface of actuator member 164. One end of spring 174 is abutted against outer flange formed at the end of the outer peripheral surface of actuator member 164 at nipple member side, and the other end is contacted with ring 172.

Figure 6:
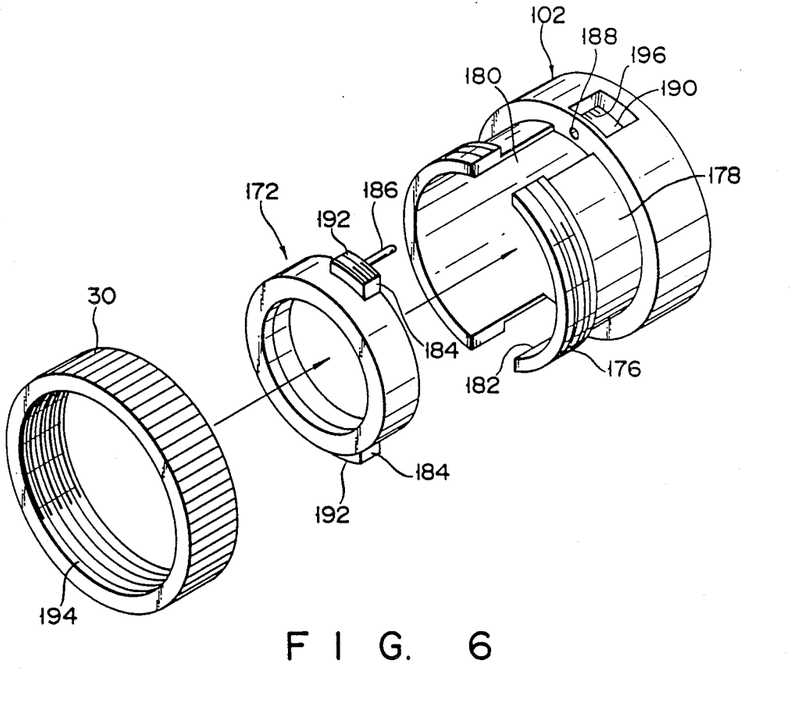
FIG. 6 is a perspective exploded view showing a rear case which is a part of a body of the pressure regulating apparatus, a pressure regulating ring member which is a part of urging force regulating means attached to the rear case, and a spring retainer ring as an urging force regulating member of FIG. 4.

Annular guide groove 178 is formed adjacent to threaded part 176 to be threadably engaged with front case 100 on the outer peripheral surface of rear case 102, and a pair of guide cutouts 180, 182 are formed at two positions disposed diametrically on the outer peripheral wall of rear case 102. Each of guide cutouts 180, 182 is extended along the longitudinal center line from one end face located near to threaded part 176 to the other end face located far away from threaded part 176. A pair of outer projections 184 formed on the outer peripheral surface of ring 172 are inserted into a pair of guide cutouts 180, 182 so as to be slidable in a direction along the longitudinal center line, and an indicator needle 186 projected in a direction along the longitudinal center line is fixed to the end face of one projection 184, the end face being located far away from threaded part 176. Needle 186 is inserted into longitudinal hole 188 formed on the end face of guide groove 178, the end face being located far away from threaded part 176, and hole 188 is extended to scale showing recess 190 formed at a position located far away from threaded part 176 than guide groove 178 on the outer peripheral surface of rear case 102.

The outer end faces of a pair of outer projections 184 of spring retainer ring 172 are constructed by parts of a circle being concentrically with ring 172, and a threaded part 192 made of part of the same threads as those formed on threaded part 176 is formed on the outer end faces of the projections.

Pressure regulating member 30 is mounted on guide groove 178 of the outer peripheral surface of rear case 102 so that ring 30 is rotatably in the circumferential direction of rear case 102, and threaded part 194 formed on the inner surface of ring member 30 are threadably engaged with threaded parts 192 on the outer end faces of a pair of outer projections 184 of ring 172.

When spring retainer ring 172 is disposed adjacent to the inner end face of joint member 98 as shown in FIG. 4 in fluid pressure regulating apparatus 26 constructed as described above, the urging force of compression coil spring 174 is smaller than that of compression coil spring 158 of valve body 148. Thus, valve body 148 is disposed at the closed position where packing 56 is placed on valve seat 160 of cap 144 as shown in FIG. 4 by the urging force of coil spring 158, and valve body 148 disposed at the closed position makes actuator member 164 dispose at the first position where actuator member 164 is approached to joint member 98 than cap 144 as shown in FIG. 4 by pressing pin 150. At this time, even if the pressurized fluid from pressurized fluid supplying means 28 is supplied into the fluid passage of fluid pressure regulating apparatus 26 through connecting hole 140, the pressure of the pressurized fluid acts on valve body 148 to press the packing 156 on valve seat 160. Therefore, the pressurized fluid cannot pass valve seat 160, and the fluid cannot arrive at the bore of outer cylindrical member 24 of clamping plate driving means 16. In other words, pressing force by the pressure of pressurized fluid is not acted on second clamping plate 14.

In order to act pressing force by the pressure of the pressurized fluid on second clamping plate 14, pressure regulating ring member 30 is so rotated as to move spring retainer ring 172 in a direction that ring 172 moves away from joint member 98. Thus, compression coil spring 174 is compressed between ring 172 and the outer flange of actuator member 164, and the increased urging force of spring 174 moves actuator member 164 against the urging force of spring 158 of valve body 148 in a direction that actuator member 164 approaches nipple member 136. The movement of actuator 164 transmitted through pin 150 to valve body 148 moves valve body 148 away from cap 144, thereby valve body 148 is disposed at open position where packing 156 is separated from valve seat 160. The position of actuator member 164 at this time is the second position of actuator member 164.

The pressurized fluid supplied from pressurized fluid supplying means 28 to connecting hole 140 of fluid pressure regulating apparatus 26 is fed, through valve body containing hole 142 of nipple member 136, gap between packing 156 of valve body 148 and valve seat 160, pressing pin insertion hole of cap 144, and through hole 170 of actuator member 164, into fluid passage 104 of joint member 98. The pressurized fluid fed into passage 104 separates valve body 107 from valve seat 106 against the urging force of coil spring 114 and is flowed into the bore of outer cylindrical member 24 of clamping plate driving means 16, if front case 100 is so located at its peripheral position where the radially outer end of slider 110 is disposed in the deepest portion of cam 120 of front case 100.

When the radially outer end of slider 110 is disposed in the deepest portion of cam 120 of front case 100, an increase in the urging force of spring 114 generated by the separation of valve body 107 from valve seat 106 increases the abutting pressure of O-ring 116 of valve body 107 on bush 108. Thus, the pressurized fluid from fluid passage 104 is surely prevented from discharging into the atmosphere through the slider insertion hole of bush 108 of front case 100 and exhaust hole 122.

The pressurized fluid fed into the bore of outer cylindrical member 24 of clamping plate driving means 16 acts on end piston 62 of clamping plate driving means 16 and piston 48 constructed by first to fourth members 48A, 48B, 48C, 48D as described above in the description of the above-mentioned clamping plate driving means 16 with reference to FIGS. 2 and 3, and the pressing force increased by end piston 62 and piston 48 is transmitted through leadscrew shaft 22 to second clamping plate 14.

When the total of pressures loaded from the pressurized fluid to the side face of nipple member side of actuator 164 becomes larger than the urging of coil spring 174 in the fluid pressure regulating apparatus 26 constructed as described above, actuator member 164 moves farther from the end face of clamping member 136 at the actuator member side against the urging of coil spring 174 to move to the first position where it approaches joint member 98 as shown in FIG. 4. Thus, valve body 148 is returned to the closed position shown in FIG. 4 by the pressure of the pressurized fluid and the urging force of coil spring 158 to shut off the supply of the pressurized fluid from pressurized fluid supplying means 28 into the bore of outer cylindrical member 24 of clamping plate driving means 16. Here, the pressurized fluid in the bore of outer cylindrical member 24 of clamping plate driving means 16 presses valve body 107 in fluid passage 104 of joint member 98 on valve seat 106 to prevent the pressurized fluid from flowing out from the bore of outer cylindrical member 24 of driving means 16. Therefore, even after the supply of the pressurized fluid is shut off, the pressing force transmitted by the leadscrew shaft 22 of driving means 16 to second clamping plate 14 is the same as that before shutting off the supply of the pressurized fluid.

When front case 100 is disposed at the circumferential position where the radially outer end of slider 110 is disposed in the most shallow portion of cam 120 of front case 100, slider 110 moves radially inward against the urging force of coil spring 114 to separate O-ring 116 from the bottom wall of bush 108. Thus, the pressurized fluid in the bore of outer cylindrical member 24 of driving means is exhausted into the atmosphere through the slider insertion hole of bush 108 and exhaust hole 122 of front case 100 to eliminate the pressing force caused by the pressure of the pressurized fluid in the bore of outer cylindrical member 24 transmitted through leadscrew shaft 22 to second clamping plate 14.

The magnitude of the pressing force transmitted through shaft 22 to second clamping plate 14 by driving means 16 by utilizing the pressurized fluid supplied into the bore of outer cylinder 24 is proportional to the magnitude of the pressure of the pressurized fluid supplied into outer cylindrical member 24. The magnitude of the pressure of the pressurized fluid supplied into the bore of outer cylindrical member 24 is proportional to the magnitude of the pressurized fluid when actuator member 164 is moved to the first position against the urging force of coil spring 174 to thereby return valve body 148 to its closed position. In other words, the magnitude of pressing force loaded by driving means 16 to second clamping plate 14 by utilizing the pressurized fluid proportional to the magnitude of the urging force of coil spring 174, and the increase and decrease in the urging force of coil spring 174 causes the increases or decreases in the magnitude of the pressing force at the second clamping plate 14. The increase or decrease in the urging force of coil spring 174 is caused by the relative movement of retainer ring 172 in the bore of rear case 102, and such movement of ring 172 is caused by the rotation of pressure regulating ring member 30 on the outer peripheral surface of rear case 102.

As described above, it is understood that the magnitude of the urging force of spring 174 is regulated by pressure regulating ring member 30 and retainer ring 172 combined with ring member 30. Pressure regulating ring member 30 and retainer ring 172 construct urging force regulating means for regulating the magnitude of the urging force of spring 174. Retainer ring 172 acts as an urging force regulating member which is driven by pressure regulating ring member 30.

Scale plate 196, as a scale displaying means, which indicates the magnitude of the pressing force generated at second clamping plate 14 proportional to the moving distance of retainer ring 172 is fixed to the bottom surface of scale displaying recess 190 on the outer peripheral surface of rear case 102. The scale on scale plate 196 corresponding to the end of indicating needle 186, as a scale indicating member, moving together with retainer ring 172 indicates the magnitude of the pressing force generated at second clamping plate 14 by supplying the pressurized fluid from pressurized fluid supplying means 28 through fluid pressure regulating apparatus 26 to clamping plate driving means 16.

Indicating needle 186 is preferably colored with remarkable color to understand the magnitude of the pressing force indicated by the end of needle 186 at a glance when observing scale plate 196.

In the embodiment described above, fluid pressure regulating apparatus 26 is cylindrical on the outer appearance, and does not have a projection projected radially outward. Further, fluid pressure regulating apparatus 26 is connected concentrically linearly to clamping plate driving means 16 similarly having cylindrical shape in the outer appearance. Therefore, fluid pressure regulating apparatus 26 can be integrally handled with driving means 16, and even if driving means 16 is directed in any direction on base frame 10, pressure regulating ring member 30 can be readily operated.

In the embodiment described above, fluid pressure regulating apparatus 26 has indicating needle 186 for indicating the magnitude of the pressing force loaded on second clamping plate 14 proportionally to the rotation of ring member 30, needle 186 moving on scale plate 195 in the longitudinal direction of fluid pressure regulating apparatus 26 by the rotation of ring member 30.

The indicating means constructed by the combination of indicating needle 186 (scale indicating member) and scale plate 196 (scale displaying means) is easier in observing the scale than the cases that a reference line, as the scale indicating member, is formed on the outer peripheral surface of ring 30 and the same content of scale of scale plate 196 of the embodiment is formed on the scale, as the scale displaying means, on the outer peripheral surface of front case 100 or rear case 102, or that the same content of the scale of scale plate 196 of the embodiment is, on the contrary, formed on the outer peripheral surface of ring 30 and the reference line, as the scale indicating member, is formed on the outer peripheral surface of front case 100 or rear case 102, because a plurality of revolutions of ring 30 is needed to move needle 186 in a range of scale of scale plate 196 of the above embodiment. In the embodiment described above, the above-mentioned combination is only one. However, when combinations are provided on the outer peripheral surface of rear case 102 at every approx. 120° in the circumferential direction, the reading of the scale can be further ready irrespective of the position of driving means 16 on base frame 10.

The embodiment described above has been described for the present invention. The present invention is not limited to the particular embodiment described above. Various other changes and modifications may be made within the spirit and scope of the present invention.

For example, oil may be used as the compressed fluid. What is claimed is:

1. A fluid pressure regulating apparatus for regulating the pressure of a pressurized fluid supplied to a machine which uses the pressurized fluid as a driving source comprising:
   a body having a fluid passage and means for connecting the fluid passage to pressurized fluid supplying means and the machine which uses the pressurized fluid as a driving source;
   a valve seat formed in the fluid passage;
   a valve body disposed in the fluid passage so as to be movable between (i) a closed position wherein the valve body is seated on the valve seat and (ii) an open position wherein the valve body is separated from the valve seat;
   an actuator member movable between first and second positions in the fluid passage, wherein the actuator member, at the first position thereof, allows the valve body to move toward its closed position, and wherein the valve body is driven to its open position by the movement of said actuator member from the first position thereof to the second position thereof, said actuator member being urged towards the first position thereof by the pressure of the pressurized fluid in the fluid passage which is exerted upon the valve body and transmitted to the actuator member through the valve body;
   a pressure regulating ring member provided on the outer surface of the body and rotatable around an axial center line of the body;
   an urging force regulating member moveably mounted within said body;
   urging means provided in the body and acting between said actuator member and said urging force regulating member; and
   means for coupling said pressure regulating ring member to said urging force regulating member and for translating rotational movement of said pressure regulating ring about said axial center line of said body into movement of said urging force regulating member in a direction generally parallel to said axial center line, which generally parallel movement of said urging force regulating member, in turn, varies said urging force exerted upon said actuator member by said urging means.

2. A fluid pressure regulating apparatus according to claim 1, wherein
   the fluid passage is substantially oriented in a direction along the axial center line of the body,
   the valve seat is oriented in a direction along the axial center line,
   the valve body is movable between the closed position and the open position along the axial center line,
   the actuator member is movable between the first position and the second position in a direction along the axial center line, and
   the urging force regulating member is movable in the body in a direction along the axial center line.

3. A fluid pressure regulating apparatus according to claim 2, wherein
   the urging means is a coil spring provided in the body to extend along the center line thereof in a direction along the axial center line.

4. A fluid pressure regulating apparatus according to claim 3, wherein
   the valve seat, the valve body, the actuator member, the urging force regulating member, and the urging means are concentrically disposed in the body to radially overlap each other.

5. A fluid pressure regulating apparatus according to claim 1, further comprising:
   indicating means provided on the outer surface of the body so as to indicate the value corresponding to the magnitude of the urging force generated from the urging means.

6. A fluid pressure regulating apparatus according to claim 5, wherein
   said indicating means comprises:
   scale displaying means provided on the outer surface of the body so as to display a scale, and
   a scale indicating member movable with respect to the scale displaying means corresponding to the rotation of the pressure regulating ring.

7. A fluid pressure regulating apparatus according to claim 6, wherein
   said scale indicating member is fixed to the urging force regulating member to project over the outer surface of the body, and movable in a direction along the axial center line on the scale displaying means.

8. A fluid regulating apparatus comprising:
   a valve housing having a valve seat which establishes a fluid passageway;
   a valve body housed within said valve housing and axially movable therewithin between an open position, wherein said valve body is spaced from said valve seat to permit fluid to flow through said fluid passageway, and a closed position, wherein said valve body is seated with respect to said valve seat thereby preventing fluid from flowing through said fluid passageway;
   an actuator member housed within said valve housing and moveable axially therewithin between first and second positions; and fluid pressure regulator means for moving said valve body between said closed and open positions in response to axial movement of said actuator between said first and second positions, respectively, thereby regulating fluid pressure, wherein said regulator means includes,
(i) a fluid pressure regulating ring concentrically rotatably mounted to said valve housing,
(ii) a force regulating ring housed within said valve housing;
(iii) urging means acting between said force regulating ring and said actuator member for exerting a bias force on said actuator member in a direction to assist movement of said actuator member from said first position thereof towards said second position thereof; and
(iv) coupling means which operatively couple said pressure regulating ring and said force regulating ring for responsively translating rotational movement of said fluid pressure regulating ring into axial movement of said force regulating ring member, which axial movement, in turn, selectively adjusts said bias force exerted on said actuator member by said urging means, whereby fluid pressure may be regulated.

9. A fluid pressure regulated apparatus as in claim 8, wherein said coupling means includes:
   at least one axial slot defined in said valve housing;
   at least one projection formed on said force regulating ring and slidably received within said at least one slot; and
   thread means for threadably interconnecting said at least one projection and said fluid pressure regulating ring, said thread means causing said at least one projection to be slidably axially displaced within said at least one slot in response to rotation of said fluid pressure regulating ring, whereby said biasing force is adjusted.

10. A fluid pressure regulating apparatus as in claim 9 further comprising visual indicator means for visually indicating force magnitude of said biasing force exerted on said actuator member.

11. A fluid pressure regulating apparatus as in claim 10 wherein said visual indicator means includes a scale associated with said valve housing, and an indicator rigidly associated with said at least one projection and in registry with said scale, wherein slidable movement of said at least one projection causes said indicator to move relative to said scale, whereby said force magnitude may be visually perceived.

* * * * *